(No Model.)

A. O. STIVESON.
HARROW.

No. 268,312. Patented Nov. 28, 1882.

WITNESSES:
J. D. Garfield
C. Sedgwick

INVENTOR:
A. O. Stiveson
BY Munn & Co
ATTORNEYS.

UNITED STATES PATENT OFFICE.

ANTHONY O. STIVESON, OF POMEROY, OHIO.

HARROW.

SPECIFICATION forming part of Letters Patent No. 268,312, dated November 28, 1882.

Application filed June 24, 1882. (No model.)

*To all whom it may concern:*

Be it known that I, ANTHONY O. STIVESON, of Pomeroy, in the county of Meigs and State of Ohio, have invented a new and Improved Harrow, of which the following is a full, clear, and exact description.

The invention consists in a harrow having its several parts constructed and combined as hereinafter described.

Reference is to be had to the accompanying drawings, forming part of this specification, in which similar letters of reference indicate corresponding parts in all the figures.

Figure 1:
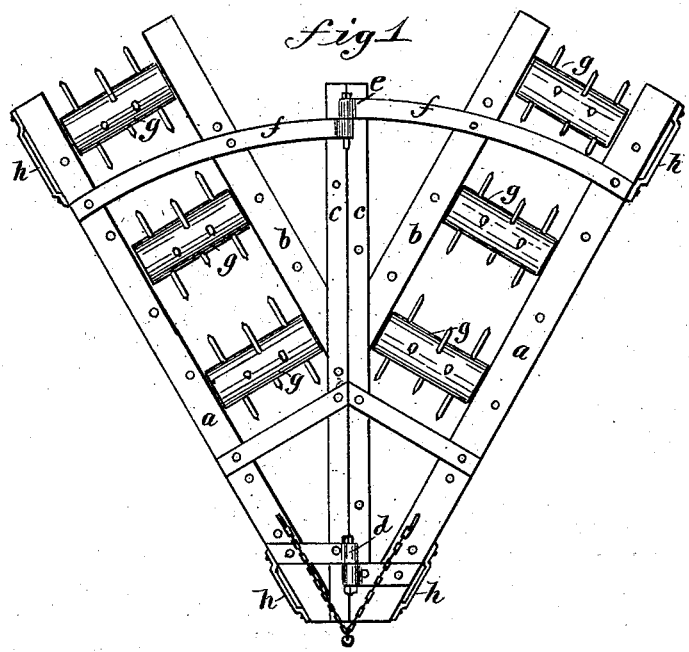
Figure 2:
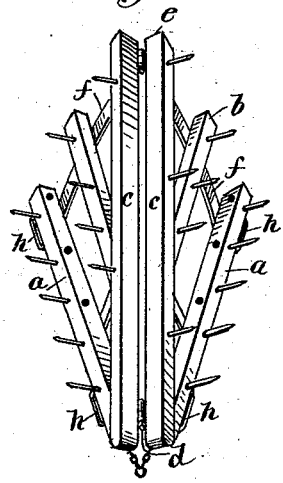
Figure 3:
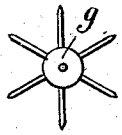

Figure 1 is a plan view of my improved harrow. Fig. 2 is a plan view, on a smaller scale, of the harrow without the spike-rolls as folded up for running over the ground from field to field; and Fig. 3 is an end view of one of the toothed rollers.

The sides of the ∧ frame of the harrow consist of the outer long bars, $a$, and inner short bars, $b$, parallel to bars $a$ and attached to the central longitudinal bars, $c$, which are pivoted together by hinges $d$ and $e$, the latter having long curved bars $f$ extending across the sides $a\ b$ and properly attached thereto. Between the parallel bars $a\ b$ of each side of the harrow I have arranged three toothed rollers, $g$, at equal intervals along said sides, the said rollers being at right angles to the said sides, but obliquely to the line of the draft of the harrow, and the teeth are arranged spirally in the rollers. The bars $a$ and $b$ are also provided with teeth, and they are preferably arranged to slant backward a little for clearing of straws, roots, and other matters from them. The middle joints allow the harrow to accommodate itself to the irregularities of the ground, and also allow one side to be raised for passing stumps and for removal of the harrow from place to place by turning one side up onto the other, and then turning it up edgewise, as in Fig. 2, by lifting up the middle, so as to utilize the runners $h$, which I have attached to bars $a$, for drawing the harrow along the ground on them.

I propose to arrange the ordinary harrow-teeth so that they may be turned half-round from time to time to sharpen by wear. The roller-teeth will be self-sharpening by the effect of their double action—that is, by their rotary action in one direction and dragging in another direction.

Having thus fully described my invention, I claim as new and desire to secure by Letters Patent—

A harrow consisting of the median bars, $c\ c$, hinged together, the parallel bars $a\ b$, attached at an acute angle thereto, and the two diverging sets of spike-rolls $g$, journaled at right angles to and between said bars $a\ b$, as shown and described.

ANTHONY O. STIVESON.

Witnesses:
WM. L. HYSELL,
THOMAS C. RADFORD.